Figure 1:
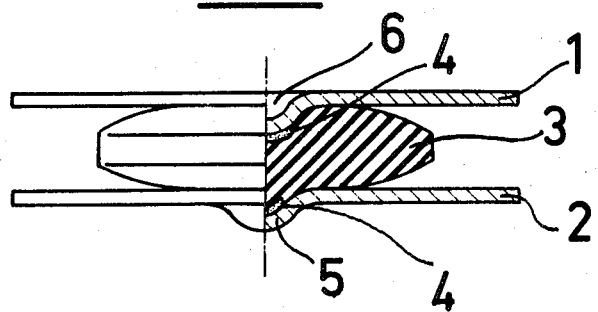

United States Patent [19]
Oeser

[11] 3,826,481
[45] July 30, 1974

[54] SPRING ELEMENT FOR BUFFER SPRINGS

[75] Inventor: Konrad Oeser, Langenheckstrasse, Germany

[73] Assignee: Getefo Gesellschaft fur technischen, Fortschritt, Germany

[22] Filed: Oct. 17, 1972

[21] Appl. No.: 298,281

[30] Foreign Application Priority Data
Oct. 18, 1971 Germany.......................... 2151705

[52] U.S. Cl. ................................................ 267/152
[51] Int. Cl. .............................................. F16f 3/08
[58] Field of Search..................... 267/141, 152, 153

[56] References Cited
UNITED STATES PATENTS
| | | | |
|---|---|---|---|
| 2,982,536 | 5/1961 | Kordes.............................. | 267/153 |
| 3,268,199 | 8/1966 | Kordyban et al. ................ | 267/152 |
| 3,584,858 | 6/1971 | Beck................................ | 267/153 |
| 3,684,271 | 8/1972 | Arthur.............................. | 267/152 |

Primary Examiner—Robert J. Spar
Assistant Examiner—Lawrence J. Oresky
Attorney, Agent, or Firm—Greene & Durr

[57] ABSTRACT

A spring element of the type comprising two metal plates and an elastic rubber body therebetween is provided wherein, instead of the rubber body filling all the space between the metal plates, this body is so constructed that it gradually fills the space as the plates are compressed. The rubber body is thicker at the center than at the perimeter and when round, is substantially of the shape of a discus. The plates have corresponding depressions in the central part, so that they can be stacked one on the other with the depressions serving to align the separate elements. Preferably, the rubber body is cemented or otherwise secured to the plates only in the central part, i.e., at the axis of the body or the corresponding depression or projection in the plates.

1 Claim, 2 Drawing Figures

SPRING ELEMENT FOR BUFFER SPRINGS

The invention is concerned with a spring element adapted, for example, as a buffer device for a vehicle running on tracks.

Spring elements for vehicles with tracks adapted to receive and absorb compressive and recoiling load applications are known especially in the U.S.A. These spring elements have outer plates of metal which are connected through an elastic rubber body. The material for such connecting bodies is known by the trademark or trade name "Vulkolan" and composed of a high-grade group of rubber-elastic synthetic materials, namely from "Desmophen 2000" in combination with "Desmodur 15."

The elastic body is connected to the outer metal plate through the total surface thereof through adhesion.

With consideration of the high, radially-directed tension on the upper surface, not only of the elastic body, but also on the adhesive, one must understand that the material "Vulkolan" is the only material at the site to resist the specifically applied stress. One must, at the same time, be tolerant of the fact that this material is not very resistant to cold and already is embrittled by small gradations of cold temperatures.

This invention is based on the problem of making a spring element for an elastic buffer, which can employ rubber as the elastic material and which excels the material so far used exclusively for the inserted material, especially in its unproblematic low temperature behavior as compared with "Vulkolan." In addition, there is the added advantage that rubber is fairly inexpensive.

This problem is solved according to the invention, by making such a spring element from two metal plates with a rubber body insertion therebetween, the two metal plates, or at least one of them, having such an outline configuration, that it extends beyond the rubber body on all its respective sides.

In each case, a relationship must exist that the height of the rubber body is less than the radius of the spring element, so that under the final load condition, the diameter of the rubber body corresponds to about that of the outer plates.

Depending on the load anticipated and on the core line of the load with respect to the spring, it is also possible to select a rubber body having a configuration deviating from the rectangular. Moreover, there is a special advantage in constructing the rubber body in the shape of a discus washer.

Further features of the invention and details thereof providing additional advantages will be apparent from the following description when considered with the attached schematic drawing showing, by way of example, an embodiment of the invention.

Figure 2:
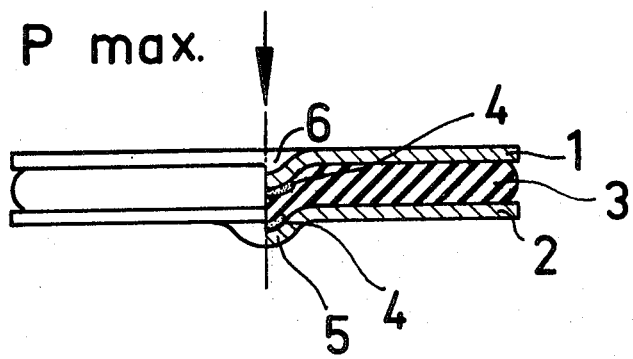

In the drawing:

FIG. 1 is a spring element made according to the invention, partly in cross-section, and with the element in unstressed condition, and FIG. 2 is a spring element similar to FIG. 1 with the element in stressed (compressed) condition.

Between two facing plates 1 and 2, an elastic body 3, of rubber or similar elastomer, is provided. The elastic body 3, together with plates 1 and 2, form the spring element. Depending on the special duty of the spring element and on the spring characteristics, the rubber body can be constructed with a cylindrical or rectangular configuration. It is important that in each case, the size relationship be so chosen that the rubber body in condition of maximum compression, $P_{max}$ as shown in FIG. 2, approximately fills the space between the two facing plates 1 and 2.

In the example illustrated, the rubber body has the cross-sectional shape about like that of a discus, being thicker in the center than at the perimeter.

It is especially advantageous, as shown in the illustrated example, that the three parts 1,2 and 1, 2 be united by a thin layer of adhesive 4, provided only in the central region. Thereby, each spring element forms an individual unit. Instead of the adhesive layer, other uniting means can be employed in certain cases.

The facing plates 1 and 2 are furthermore provided with corresponding indentations or recesses 5 and 6, in order that a plurality of such elements can be aligned and centered one over the other.

Especially by the connection in series of several spring elements into a buffer package can the rubber body 3, at times to one side of one of the plates, and at times to the next spring element as a metallic connection on the free side of the rubber body of the preceding spring element. This provides for the construction of a significantly less expensive buffer package. It is even possible to employ only rubber bodies between which at times there is arranged a facing plate, these parts being united, if necessary, through cement in the central area.

The spring element of the invention is distinguished by being adjustable for special uses and for its outstandingly suitable characteristics. It utilizes a comparatively cheap material, namely rubber, which, besides, provides exactly those characteristics desirable for the present object, its properties only slightly declining at low temperatures.

When a plurality of spring elements are connected in series to form a package, the rubber body may be equipped only on one side with a facing plate. The spring element of the invention is especially useful when a plurality or multiplicity of such elements are arranged in series to provide a buffer spring or elastic buffer.

I claim:

1. A spring element comprising two metal plates and a body of rubber therebetween, at least one of said metal plates extending beyond the perimeter of the body of elastic material on all sides of the latter, each of said metal plates having a centrally located depression therein extending to both sides of the plate, said rubber body having a centrally located depression to fit the depression of a first of said plates and a centrally located projection to fit the projecting side of the depression in the second plate, whereby a plurality of said elements may be stacked in aligned relationship, said rubber body being cemented to said first and second plates only at the central portions thereof.

* * * * *

UNITED STATES PATENT OFFICE
CERTIFICATE OF CORRECTION

Patent No. 3,826,481          Dated July 30, 1974

Inventor(s)  Konrad Oeser

It is certified that error appears in the above-identified patent and that said Letters Patent are hereby corrected as shown below:

First (title) Page, left hand column, the assignee should be

--- Getefo Gesellschaft für technischen Fortschritt m.b.H. ---

Signed and sealed this 10th day of December 1974.

(SEAL)
Attest:

McCOY M. GIBSON JR.  
Attesting Officer

C. MARSHALL DANN  
Commissioner of Patents